United States Patent
D'Amato et al.

(10) Patent No.: US 7,040,219 B1
(45) Date of Patent: May 9, 2006

(54) CHICKEN LEG GRILL RACK

(76) Inventors: Jim D'Amato, 20 Berry Pl., Glen Rock, NJ (US) 07452; John Battaglia, 98 Cardinal La., Westwood, NJ (US) 07675

( * ) Notice: Subject to any disclaimer, the term of this patent is extended or adjusted under 35 U.S.C. 154(b) by 0 days.

(21) Appl. No.: 10/708,472

(22) Filed: Mar. 5, 2004

Related U.S. Application Data

(63) Continuation of application No. 10/625,139, filed on Jul. 23, 2003, now Pat. No. 6,827,006.

(51) Int. Cl.
*A47J 43/18* (2006.01)
(52) U.S. Cl. .......................... 99/426; 99/448; 211/181.1
(58) Field of Classification Search ................. 99/426, 99/448, 449, 450; 211/181.1, 175, 60.1
See application file for complete search history.

(56) References Cited

U.S. PATENT DOCUMENTS

| | | | | |
|---|---|---|---|---|
| D161,741 S | * | 1/1951 | Dartt | ........................... D6/464 |
| 3,532,225 A | * | 10/1970 | Reed | ...................... 211/181.1 |
| 5,730,046 A | * | 3/1998 | Battaglia et al. | .............. 99/426 |

* cited by examiner

*Primary Examiner*—Reginald L. Alexander
(74) *Attorney, Agent, or Firm*—Richard A. Joel, Esq.

(57) ABSTRACT

A rack for grilling chicken legs comprises a unitary wire structure including a base and inclined upwardly extending members at each end of the base and a transverse portion joining the tops of said members. A plurality of substantially U-shaped members are mounted to the transverse member at the legs forming the open end of the "U". The legs of the U-shaped members form a parallel slot between adjacent members to engage and support a plurality of chicken legs in a vertical position above grill. The wire legs also form a central slot comprising a handle in addition to support chicken legs.

9 Claims, 4 Drawing Sheets

CHICKEN LEG GRILL RACK

CROSS REFERENCE TO RELATED APPLICATIONS

This invention relates to cooking facilities and particularly to a new and inexpensive rack for grilling chicken legs in a new and improved manner. This application is a continuation of pending application Ser. No. 10/625,139 filed Jul. 23, 2003 now U.S. Pat. No. 6,827,006.

BACKGROUND OF INVENTION

In barbecuing chicken legs, it is extremely difficult to cook the legs uniformly without burning. The legs must be constantly watched and rotated on the grill. Unfortunately, even with considerable attention, it is quite easy to burn the legs or cook the legs in a non-uniform manner. The present invention is designed to permit uniform cooking of a plurality of chicken legs without the problems associated with the prior art method. The invention comprises a unique rack which holds the legs in a vertical position spaced at a predetermined distance above the fire for uniform cooking without the problem of burning.

In the prior art, U.S. Pat. No. 2,269,310 discloses a display device for supporting and displaying axe and shovel handles. The device includes a plurality of spaced parallel slots with openings at one end. The device is for a use different from the present invention and apart from apparent similarity of parallel slots, is different in structure.

U.S. Pat. No. 5,730,046 to Battaglia, et al discloses a rack for grilling chicken legs in a barbecue comprising a flat elongated rack surface including a plurality of slots to hold chicken legs in a vertical position at a predetermined distance above the grill. The slots are sized to support chicken legs by engaging the leg joint with the meaty leg portion extending vertically below the flat rack surface. Applicant's invention is an improvement on this design.

U.S. Pat. No. 4,559,869 is directed to an adjustable barbecue rack for supporting a plurality of spareribs. The device includes a plurality of racks removably secured to a main rack. Another version of a barbecue rack is shown in U.S. Pat. No. 4,458,585 wherein a cooking surface is defined by spaced rods formed in a particular manner.

Other patents of general interest include U.S. Pat. Nos. 4,677,906; 4,583,647; 4,765,584; 4,184,592; and, 4,542,684. None of the prior art patents mentioned above affect the patentability of the present invention which relates to a unique, efficient and inexpensive rack for grilling chicken legs.

SUMMARY OF INVENTION

This invention relates to cooking devices and particularly to a device or rack for grilling chicken legs on a barbecue marketed as the E*Z Legs rack. The prior art devices for grilling chicken legs were generally no more than an open grill where the legs had to be constantly rotated to prevent burning. While the concept of supporting chicken legs vertically over a grill is also disclosed in the prior art, such designs are relatively expensive and bulky an lack the features of the present invention. In the present invention, the legs are suspended from a specially designed wire rack at a predetermined distance above the fire to permit uniform cooking without burning.

The unique rack of the present invention comprises a unitary wire structure with a substantially rectangular base wherein the formed wire comprises three sides of the rectangle and a wire cross bar is welded at each end to the formed wire to form the fourth side of the rectangle or square. Members extend upwardly a predetermined distance from the wire cross bars at the base corners. The upwardly extending members terminate in slots at each end extending inwardly and then outwardly to form a slot for mounting chicken legs upside down. The outward extension of each slot curves inwardly and upwardly to form a slotted handle which can also be used to mount chicken legs.

In an alternate embodiment, the rack can be circular and can be used in a turkey deep fryer. The rack can also be used commercially for chicken and turkey legs.

In use, the rack is placed on a barbecue with three chicken legs mounted in each of the upper slots and extending downwardly. Chicken legs can also be mounted in the handle slot. The legs are cooked uniformly in the parallel slots. The upwardly extending side supports may be pulled apart to release the legs from the slots.

Accordingly, an object of this invention is to provide a new and improved barbecue grilling device for chicken legs.

Another object of this invention is to provide a new and improved inexpensive barbecue rack for uniformly grilling chicken legs.

A further object of this invention is to provide a new and improved wire barbecue rack wherein a plurality of chicken legs may be mounted in an upside down position with the meaty portion extending downwardly from parallel slots formed by wires to permit uniform grilling and prevent burning.

A more specific object of this invention is to provide a new and improved wire rack for grilling chicken legs and the like which is pivotally mounted to the barbecue cover to swing into and out of a cooking position and which includes a plurality of spaced parallel slots for insertion of chicken legs to hold the legs in an upside down position at a predetermined distance above the fire.

BRIEF DESCRIPTION OF DRAWINGS

The above and other objects and advantages of the present invention may be more clearly seen when viewing in conjunction with the accompanying drawings wherein.

FIG. 3 is a side view of the invention with the chicken legs suspended from the rack; and.

DETAILED DESCRIPTION

Figure 1:
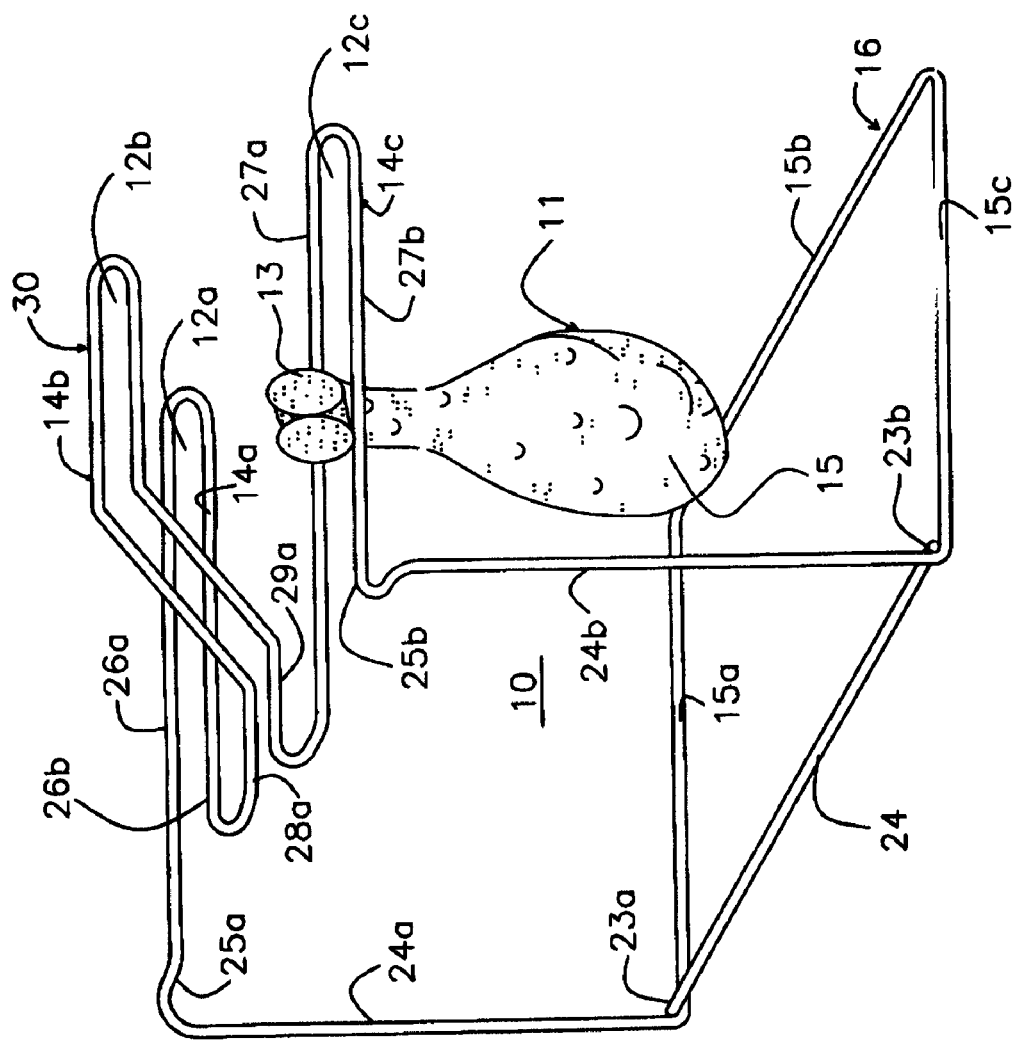
FIG. 1 is a perspective view of the invention showing a chicken leg suspended above the grill.
Figure 2:
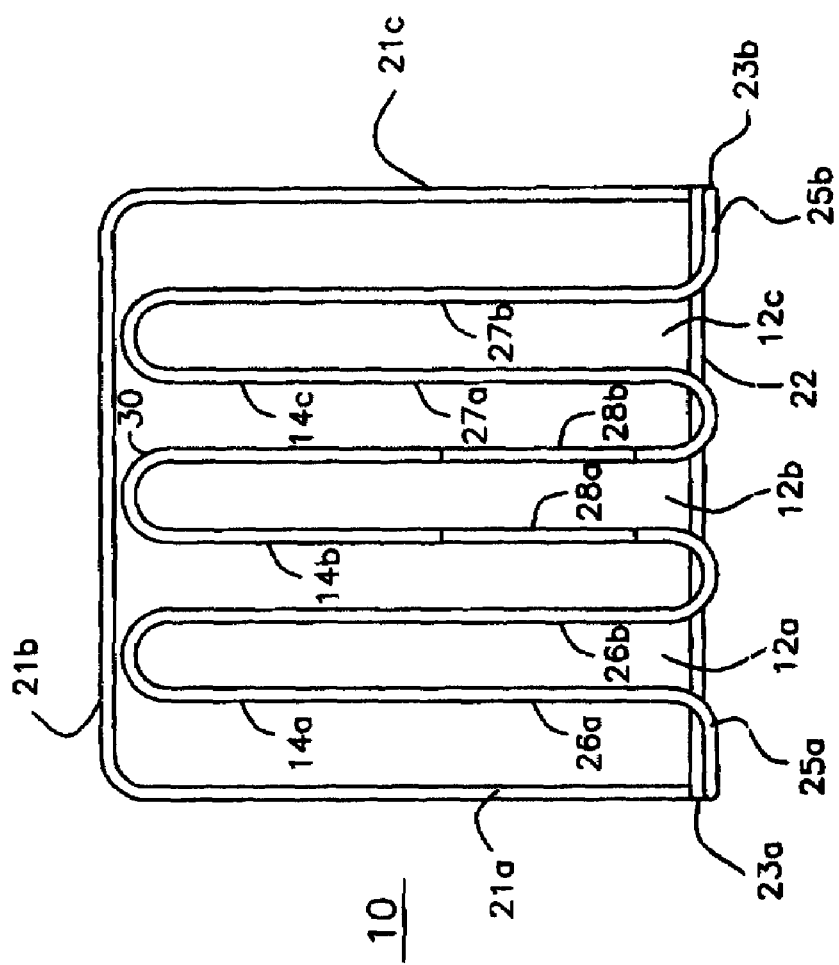
FIG. 2 is a top view of the invention illustrating the mounting slots on the unique rack comprising the invention.
Figure 3:
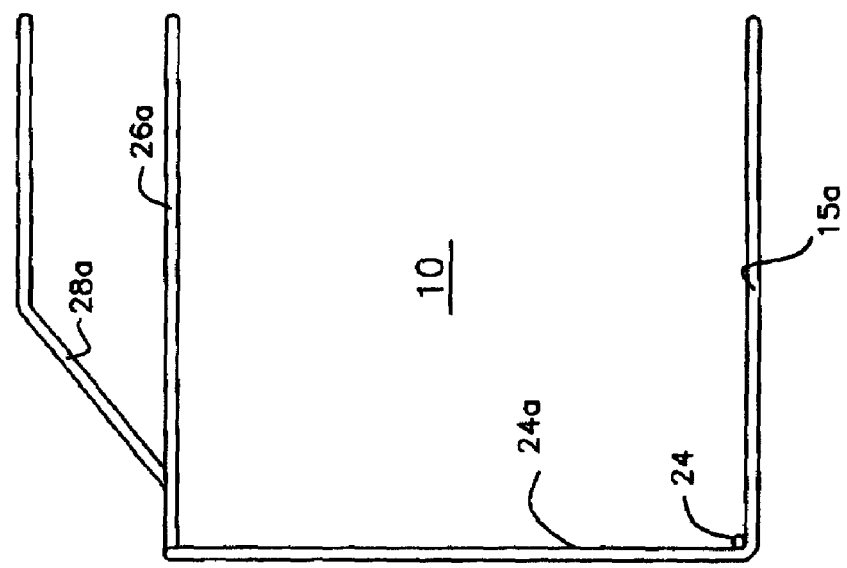
Figure 4:
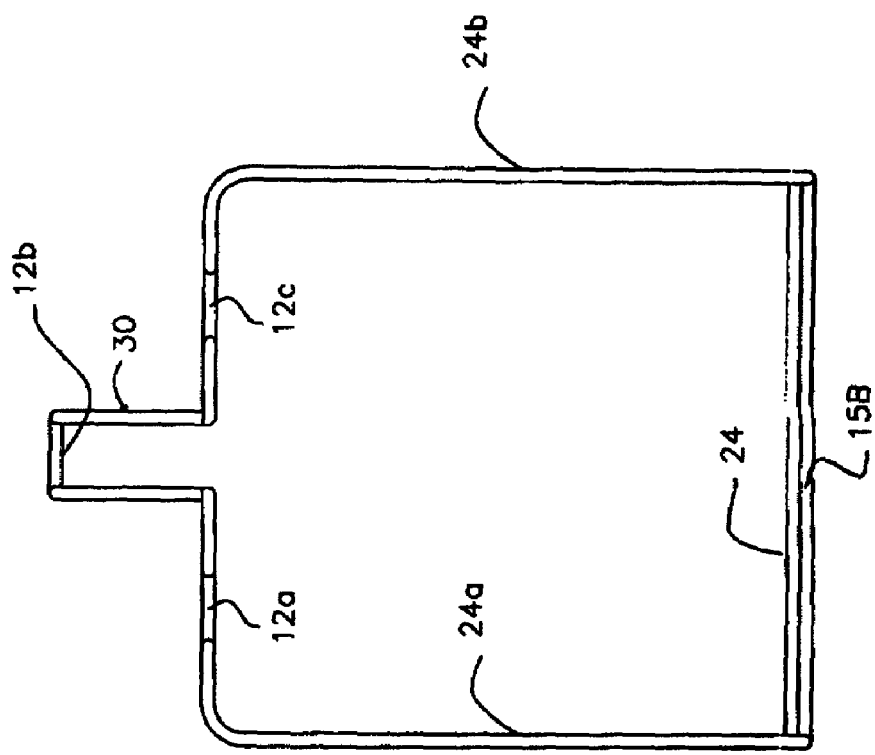
FIG. 4 is a front view of the invention.

Referring now to the drawings, the invention comprises a unique wire rack 10 for grilling chicken legs 11 vertically in a barbecue. The rack 10, as shown in the perspective view of FIG. 1 can, support a plurality of chicken legs 11 in a plurality of slots 12a–c above the grill. The chicken legs 11 are placed in the slots 12a–c with the leg joint 13 held in place by the U-shaped members 14a–c forming the slots sides and the meaty portion 15 of the leg extending downwardly above the grill. The rack 10 is then placed on the grill. Alternatively, the rack 10 may be made of plastic for microwave use. The rack design 10 may also be used with a barbecue, oven, deep fryer or microwave.

The rack 10 comprises a unitary wire structure with a substantially rectangular or square base wherein the formed wire comprises three sides of the rectangle and a wire cross bar 24 is welded at each end 23a, 23b to form the fourth side of the rectangle or square 15a, 15b and 15c. Members 24a and 24b extend vertically upward at the cross bar for approximately six inches to accommodate downwardly extending chicken legs. The members would extend vertically upward for a greater height if turkey legs are to be grilled.

As shown in FIG. 1, the upper portion of the rack 10 which holds the chicken legs comprises wire portions 25a and 25b which extends inwardly at right angles from the top of members 24a and 24b, respectively. The wire portions 25a, 25b then curve inwardly and outwardly forming slots with parallel sides 26a and 26b and 27a and 27b. The sides 28a and 29a curve inwardly with parallel sides which extend upwardly at a predetermined angle in the range of 40°. The sides then extend parallel to the wire portions 26a, 26b and 27a, 27b and join forming a raised handle 30 for the rack 10. Alternatively, the handle sides 28a and 28b form a slot 12b therebetween which can accommodate two chicken legs while the slots 12a and 12c can accommodate at least three chicken legs.

In one preferred embodiment, the distance between base sides 21a and 21c would be 5.75 inches and the members 24a and 24b would extend vertically 5.75 inches or higher if turkey legs are to be grilled. A typical distance between the slot sides would also be 5.75 inches with the radius at the end of the slots comprising a 0.312 radius The slot radius may be somewhat smaller depending on the size of the chicken legs. With the six inch height of the upper portion of the rack 10, the vertically held legs and the meaty portion thereof drip to a barbecue fire or oven pan without flare-ups which lead to burning.

In operation, each chicken leg 11 is inserted into a slot 12a, 12b or 12c with the leg joint 13 holding the leg 11 in position with the meaty portion extending vertically downward from the slot 12a, 12b or 12c. The suspended legs 11 on the rack 10 are then placed on the grill with the base 16 resting on the grill. The cover is then closed for a predetermined time at a preset temperature. The legs 11 are uniformly cooked for twenty-five to forty-five minutes in the vertical position which minimizes the potential for flare-up and burning. The legs 11 are uniformly grilled, three in each slot 12a and 12c and two in the handle slot 12b, if desired.

The lightness and shaped wire design of the rack are distinctive advantages. Indeed the rack 10 could be redesigned to collapse for storage purposes with pivotal joints at the corners. In a further embodiment, the wire rack 10 could be pivotally mounted to the interior of the barbecue cover to swing into and out of a cooking position when the cover is opened or closed. The invention could be secured or attached to the base of the grill. Further design changes would affect the wire angles noted in the preferred embodiment. Also, the member of slots 12a, 12b, 12c and the size of the base 21a, 21b, 21c and 22 may be varied to accommodate additional legs 11.

The flexible wire used in the rack construction is preferably 4.0 mm nickel chrome steel or similar metal which is flexible to permit the vertical supports to be pulled outwardly to release the chicken legs with ease. The slots or loops are easily cleaned. Further, the handle balances the weight and a plurality of racks may nest together for storage purposes. The rack 10 is inexpensive since it is made from form wire with one butt weld and two spot welds.

While the invention has been explained by a detailed description of certain specific embodiments, it is understood that various modifications and substitutions can be made in any of them within the scope of the appended claims which are intended also to include equivalents of such embodiments.

The invention claimed is:

1. A wire rack for grilling chicken legs in a vertical position on a barbecue with the leg joint on the upper end and the meaty portion at the lower end comprising:
   a base comprising a three sided wire rectangle having two parallel wire portions joined by a unitary wire cross portion at one end;
   a wire cross member mounted to the other ends of the parallel portions and forming a base rectangle;
   a vertical portion extending upwardly a predetermined distance from each end of the parallel wire portions, an upper portion curving inwardly parallel to the cross-member at each end for a set distance and then outwardly parallel to the base parallel portions to a point vertically above the base cross portion said upper portions having a portion extending inwardly parallel to the outwardly extending portion to form a slot therebetween; and
   a wire portion extending outwardly from the portion forming a slot at each end and then extending upwardly to form a handle slot therebetween.

2. A wire rack for grilling chicken legs in accordance with claim 1 wherein:
   the slots each accommmodate at least three chicken legs mounted therein.

3. A rack for grilling chicken legs in accordance with claim 1 wherein:
   the handle slot accommodates two chicken legs mounted therein.

4. A rack for grilling chicken legs in accordance with claim 1 wherein:
   the base, vertical portions and handle comprise a uniform wire of a predetermined size; and
   the cross member is a separate wire welded to the base.

5. A wire rack for grilling chicken legs in a vertical position on a barbecue with the leg joint on the upper end and the meaty portion at the lower end comprising:
   a rectangle wire base;
   a pair of parallel vertical portions extending upwardly from the base;
   a portion extending outwardly and then inwardly at each end of the vertical portion to form a slot therebetween; and,
   a portion extending inwardly and then upwardly at an angle from each end of the slot to a slotted portion parallel to the base to form a handle therebetween.

6. A wire rack for grilling chicken legs in accordance with claim 1 or 5 wherein:
   the rack comprises a plastic wire for microwaving purposes.

7. A wire rack for grilling chicken legs in accordance with claim 1 or 5 wherein:
   the handle facilitates nesting a plurality or racks.

8. A wire rack for grilling chicken legs in accordance with claim 1 or 5 wherein:
   the wire comprises a flexible 4 mm nickel chrome steel which permits releasing the chicken les from the slots by spreading the vertical portions apart.

9. A wire rack for grilling chicken legs in accordance with claim 1 or 3 wherein:
   the handle portions extend upwardly at an angle of approximately 40 degrees.

* * * * *